US008606615B2

(12) United States Patent
Milden et al.

(10) Patent No.: US 8,606,615 B2
(45) Date of Patent: Dec. 10, 2013

(54) SYSTEM FOR MANAGING AND TRACKING AN INVENTORY OF ELEMENTS

(75) Inventors: Robert L. Milden, Waxhaw, NC (US); Terri C. Kennell, Jacksonville, FL (US); Timothy Carbery, Amherst, NH (US); Anne-Marie Dunphy, Weymouth, MA (US); Heidi L. Cooper, Jacosonville, FL (US)

(73) Assignee: Bank of America Corporation, Charlotte, NC (US)

( * ) Notice: Subject to any disclaimer, the term of this patent is extended or adjusted under 35 U.S.C. 154(b) by 313 days.

(21) Appl. No.: 13/218,831

(22) Filed: Aug. 26, 2011

(65) Prior Publication Data

US 2012/0331131 A1   Dec. 27, 2012

Related U.S. Application Data

(60) Provisional application No. 61/501,603, filed on Jun. 27, 2011.

(51) Int. Cl.
  G06Q 10/00    (2012.01)
  G06Q 10/06    (2012.01)
(52) U.S. Cl.
  CPC .................................. *G06Q 10/0633* (2013.01)
  USPC ......................................................... 705/7.27
(58) Field of Classification Search
  None
  See application file for complete search history.

(56) References Cited

U.S. PATENT DOCUMENTS

| | | | |
|---|---|---|---|
| 6,141,720 A * | 10/2000 | Jeffords et al. | 710/200 |
| 6,510,478 B1 * | 1/2003 | Jeffords et al. | 710/200 |
| 6,529,909 B1 * | 3/2003 | Bowman-Amuah | 1/1 |
| 7,197,502 B2 * | 3/2007 | Feinsmith | 1/1 |
| 7,289,964 B1 * | 10/2007 | Bowman-Amuah | 705/1.1 |
| 7,373,310 B1 * | 5/2008 | Homsi | 705/7.12 |
| 7,716,592 B2 | 5/2010 | Tien et al. | |
| 7,970,729 B2 * | 6/2011 | Cozzi | 707/601 |
| 8,024,275 B2 * | 9/2011 | Stone | 705/301 |
| 2001/0001864 A1 * | 5/2001 | Page et al. | 709/205 |
| 2003/0018519 A1 * | 1/2003 | Balz et al. | 705/11 |
| 2003/0112666 A1 * | 6/2003 | Hageman et al. | 365/200 |
| 2004/0078373 A1 * | 4/2004 | Ghoneimy et al. | 707/10 |
| 2004/0128186 A1 * | 7/2004 | Breslin et al. | 705/10 |
| 2005/0132048 A1 * | 6/2005 | Kogan et al. | 709/225 |

(Continued)

OTHER PUBLICATIONS

ISA/US, Commissioner for Patents, International Search Report and Written Opinion of International Searching Authority for International Application No. PCT/US12/44289 date of complete Aug. 27, 2012, date of mailing Sep. 17, 2012.

*Primary Examiner* — Brett Feeney
(74) *Attorney, Agent, or Firm* — Michael A. Springs; Moore & Van Allen, PLLC; Andrew D. Gerschutz

(57) ABSTRACT

Embodiments of the invention relate to systems, methods, and computer program products for managing and tracking an inventory of controlled elements, wherein a database comprising a plurality of elements is maintained, an owner is assigned to each element, the relationships between elements are identified and related elements are linked. The elements are then monitored to identify changes to the elements. Any identified change is confirmed, and if material, the owners of related elements are notified of the changes the need to be made to the related elements and the plurality of elements are monitored to determine when all required changes have been made. Once all the required changes are a made, the owners of the identified elements are required to provide final confirmation that no further changes are needed.

21 Claims, 6 Drawing Sheets

(56) References Cited

U.S. PATENT DOCUMENTS

| | | | |
|---|---|---|---|
| 2005/0138031 A1* | 6/2005 | Wefers | 707/9 |
| 2005/0149375 A1* | 7/2005 | Wefers | 705/9 |
| 2005/0182773 A1* | 8/2005 | Feinsmith | 707/100 |
| 2006/0005124 A1* | 1/2006 | Speicher | 715/514 |
| 2006/0047558 A1* | 3/2006 | Uchiyama et al. | 705/9 |
| 2006/0106825 A1* | 5/2006 | Cozzi | 707/100 |
| 2006/0247965 A1* | 11/2006 | Griffith et al. | 705/9 |
| 2007/0033571 A1* | 2/2007 | Moore et al. | 717/104 |
| 2007/0150496 A1* | 6/2007 | Feinsmith | 707/100 |
| 2007/0211056 A1* | 9/2007 | Chakraborty et al. | 345/440 |
| 2007/0271381 A1* | 11/2007 | Wholey et al. | 709/226 |
| 2007/0299795 A1* | 12/2007 | Macbeth et al. | 706/16 |
| 2007/0300224 A1* | 12/2007 | Aggarwal et al. | 718/100 |
| 2008/0222147 A1* | 9/2008 | Homsi | 707/6 |
| 2008/0255891 A1* | 10/2008 | Stone | 705/7 |
| 2009/0265209 A1* | 10/2009 | Swaminathan et al. | 705/9 |
| 2011/0246253 A1* | 10/2011 | Yu et al. | 705/7.13 |
| 2011/0282708 A1* | 11/2011 | Rangaswamy et al. | 705/7.27 |
| 2011/0282709 A1* | 11/2011 | Rangaswamy et al. | 705/7.27 |
| 2011/0282829 A1* | 11/2011 | Rangaswamy et al. | 707/608 |
| 2012/0109702 A1* | 5/2012 | Leung | 705/7.15 |
| 2012/0209803 A1* | 8/2012 | Napierala, II | 707/608 |
| 2013/0046583 A1* | 2/2013 | Kanhed et al. | 705/7.36 |

* cited by examiner

SYSTEM FOR MANAGING AND TRACKING AN INVENTORY OF ELEMENTS

CLAIM OF PRIORITY UNDER 35 U.S.C. §119

This Non-provisional patent application claims priority to Provisional Patent Application Ser. No. 61/501,603 titled "System for Managing and Tracking an Inventory of Elements" filed Jun. 27, 2011, assigned to the assignee hereof and hereby expressly incorporated by reference herein.

FIELD

In general, embodiments of the invention relate to methods, systems, apparatus and computer program products for managing and tracking an inventory of controlled elements, such as a business' policies, procedures and training programs to map the relationships between the elements and ensure changes made to any element are correctly adopted and incorporated into all related elements.

BACKGROUND

All entities (e.g. financial institutions, businesses, universities, etc.) have various control elements, such as laws, requirements, procedures, policies etc. that the entity must follow in order to operate. Many of these control elements are related to each other, so that a change to one element necessitates a change to the other elements.

As an entity grows in size and complexity the number of control elements to which the entity must adhere increases as well. Eventually it becomes difficult to track the relatedness of the entity's control elements, and consequently, it becomes increasingly difficult to understand how one change to an element will affect other elements and to ensure that when an element is changed that the necessary change is adopted or incorporated into all related elements.

Therefore, a need exists for a system that can map the relationships between an entity's control elements and ensure that changes made to any one element are correctly adopted and incorporated into all related elements.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Some embodiments of the present invention provide a method for managing and tracking an inventory of elements, comprising maintaining a database comprising a plurality of elements. Each element is assigned an owner who has primary responsibility to ensure that the requirements of the element are followed and implemented. Further, the relationships between the elements are identified and related elements are linked. The elements are then monitored, for instance via a processor, to identify any changes made to the elements. If a change is identified, the change will be confirmed. If the change is identified as a material change, an event is created wherein the event comprises the activities that must be completed to incorporate the identified change. Thereafter, the owners of elements related to the element with the identified change are notified of the event. The plurality of elements is monitored, for example by the processor, for changes to determine when all of the activities required by the event have been completed. Once all of the activities in the event are completed, a final request is sent to the owner of the element with the identified change and to the owners of all elements related to the changed element to confirm that no further changes are required. In certain embodiments, the elements include one or more of the following: laws, regulations, requirements, contracts, contract terms, policies, procedures, processes, enablements, training programs, supports, tools, incentives, business activities, controls and metrics.

In some embodiments, assigning an owner to each element comprises identifying the elements without an owner and identifying the elements with an owner that is no longer suited to own the element. If an element has no owner a new owner is selected for the element and ownership of the element is communicated to the new owner, for instance via a communication interface of a computer platform, wherein the new owner must confirm the ownership of the element. If an element with an owner that is no longer suited to own the element is identified, a new owner is selected and a communication is sent to the new owner identifying the new owner as the owner of the element, wherein the new owner must confirm ownership of the element. In such embodiments, confirming ownership of the element by the new owner comprises acknowledging and confirming the requirements of owning the element.

In some embodiments of the invention, confirming an identified change comprises, identifying a stakeholder for the element with the identified change, wherein a stakeholder is an individual or group of individuals that is responsible for coordinating changes to a particular element type and communicating the identified change to the stakeholder. A classification for the identified change is then received from the stakeholder along with confirmation that the identified change is material. In some such embodiments, the classification for the identified change will be either as a new change or a change in response to an existing event.

Some embodiments of the present invention will also include monitoring, via the processor, performance metrics and analyzing, via the processor trends in the metrics resulting from a change to one or more of the plurality of elements. Other embodiments of the invention include the step of presenting, via a display a visual representation of the relationships between elements.

Certain embodiments of the invention provide an apparatus comprising a memory, wherein a database comprising a plurality of elements is stored and a processor that is operatively connected with the memory. The processor is configured to assign ownership to each element, identify relationships between elements, monitor the plurality of elements to identify changes to the elements and confirm an identified change to an element. If an identified change is material, the processor is configured to create an event comprising activities that must be completed to incorporate the identified change and notify the owners of elements related to the element with the identified change of the event. The processor is also configured to monitor changes to the plurality of elements to determine when all of the activities required by the event are completed and request a final confirmation from all of the owners of elements related to the element with the identified change, once all activities in the event have been completed, that no further changes are required.

In some such embodiments, the processor, in assigning an owner to each element, is further configured to identify elements without an owner, select a new owner for the element, and communicate ownership of the element to the new owner wherein the new owner must confirm ownership of the element. In other embodiments, the processor, in assigning an owner to each element, is further configured to identify elements with an owner who is no longer suited to own the identified element, select a new owner for the element and communicate ownership of the element to the new owner, wherein the new owner must confirm ownership of the element. In such embodiments, confirming ownership of the element further comprises acknowledging and confirming the requirements of owning the element.

In certain embodiments of the apparatus the processor, in confirming an identified change, is further configured to identify a stakeholder for the element with the identified change, wherein a stakeholder is an individual or group of individuals that is responsible for coordinating changes to a particular element type, communicate the identified change to the stakeholder, receive a classification for the identified change and confirm that the identified change is material. In some such embodiments the identified change is classified as either a new change or a change in response to an existing event.

The processor, in some embodiments, is further configured to monitor performance metrics and analyze trends in the performance metrics resulting from a change to one or more of the plurality of elements. In other embodiments, the apparatus also includes a display and the processor is configured to present on the display a visual representation of the relationships between elements.

Embodiments of the present invention further provide a computer program product comprising a non-transitory computer-readable medium having a computer-executable code stored thereon, the computer executable code comprising a number of code portions. A first code portion is configured to receive inputs from a user to create and maintain a database comprising a plurality of elements. A second code portion is configured to output a list of the plurality of elements and an interface that allows the user to assign an owner to each element. A third code portion is configured to identify one or more elements wherein a change to the element requires a change to one or more of the other elements. A fourth code portion is configured to monitor the plurality of elements to identify changes to the elements. A fifth code portion is configured to determine the nature of an identified change to an element. A sixth code portion is configured to create an event if an identified change is material, the event comprising activities that must be completed to incorporate the identified change. A seventh code portion is configured to communicate the creation of an event to the owners of elements related to the element with the identified change. An eighth code portion is configured to monitor changes to the plurality of elements to determine when all of the activities required by the event are completed. A ninth code potion is configured to request a final confirmation from all of the owners of elements related to the element with the identified change, once all activities in the event have been completed, that no further changes are required.

In some embodiments of the computer program product, the second code portion is further configured to identify elements without an owner, receive inputs from the user identifying a new owner for the element and communicate ownership of the element to the new owner, wherein the new owner must confirm ownership of the element. In other embodiments, the second code portion is further configured to identify elements with an owner who is no longer suited to own the identified element, receive inputs from the user identifying a new owner for the element, and communicate ownership of the element to the new owner, wherein the new owner must confirm ownership of the element. In such embodiments confirming ownership of the element comprises acknowledging and confirming the requirements of owning the element.

In certain embodiments of the computer program product, the fifth code portion is further configured to identify a stakeholder for the element with the identified change, communicate the identified change to the stakeholder, receive a classification for the identified change from the stakeholder and confirm that the identified change is material. In such embodiments, the classification for the identified change may be that the change is a new change or a change in response to an existing event.

Some embodiments of the computer program product will also feature a code portion configured to monitor performance metrics, a code portion configured to analyze trends in the metrics resulting from a change to one or more of the plurality of elements and a code portion configured to display the performance metrics on a display. Embodiments of the computer program product may also include a code portion configured to present a visual representation of the relationships between elements.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
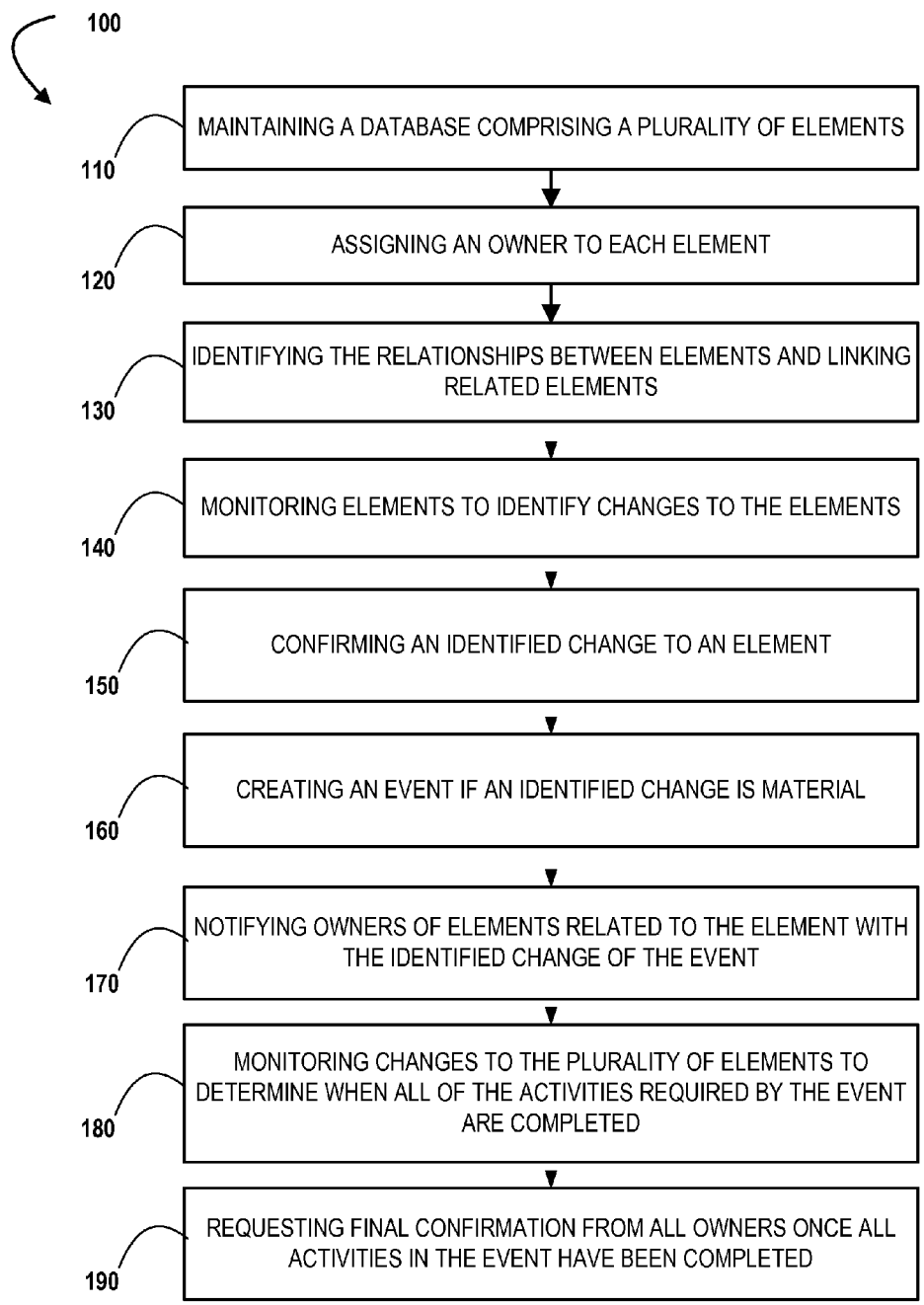

Having thus described embodiments of the invention in general terms, reference will now be made to the accompanying drawings, which are not necessarily drawn to scale, and wherein:

FIG. 1 is a flow diagram illustrating a process flow for an apparatus for managing and tracking an inventory of elements, in accordance with embodiments of the invention.

Figure 2:
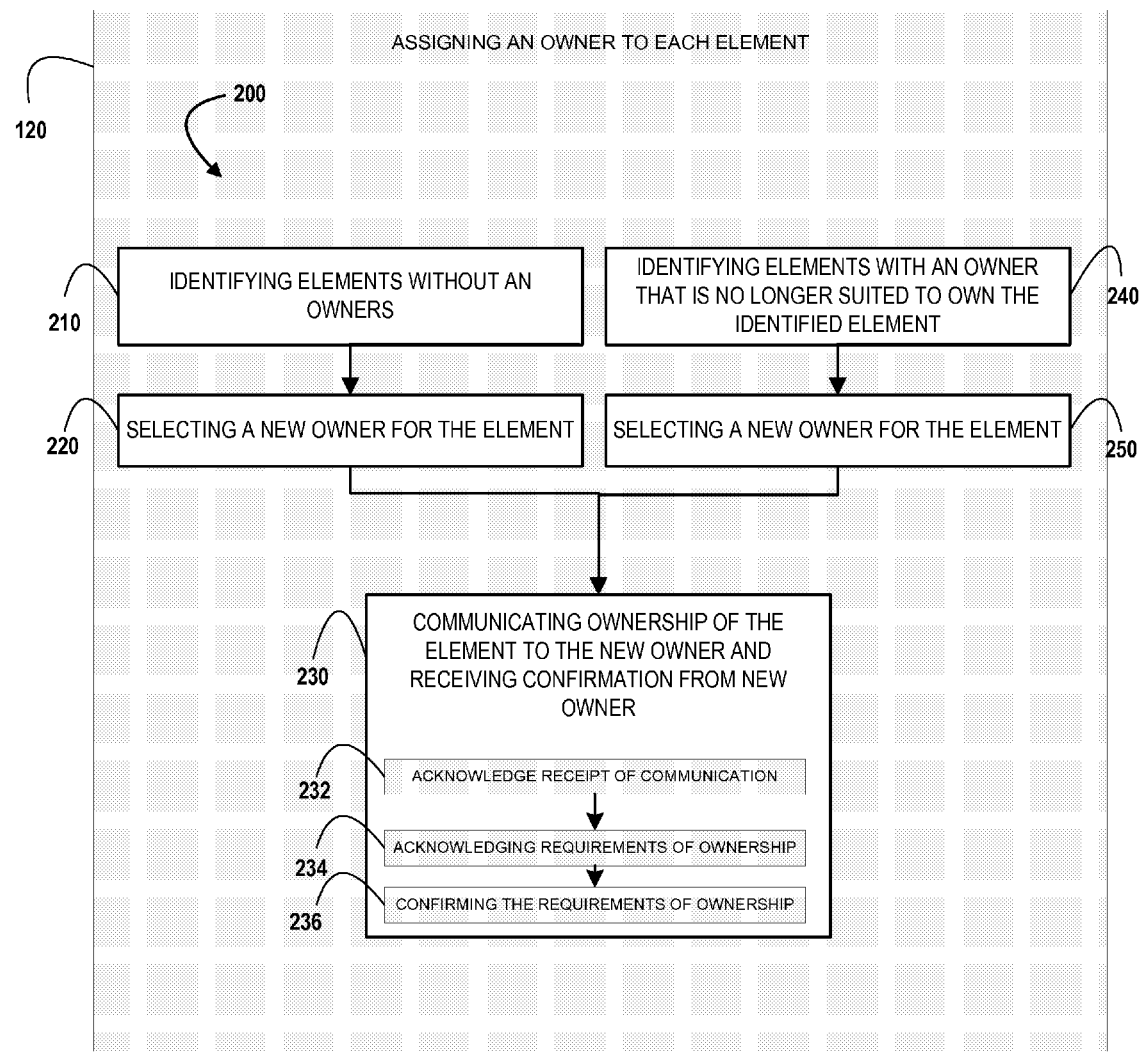

FIG. 2 is a flow diagram illustrating a process flow for assigning an owner to each element, in accordance with embodiments of the invention.

Figure 3:
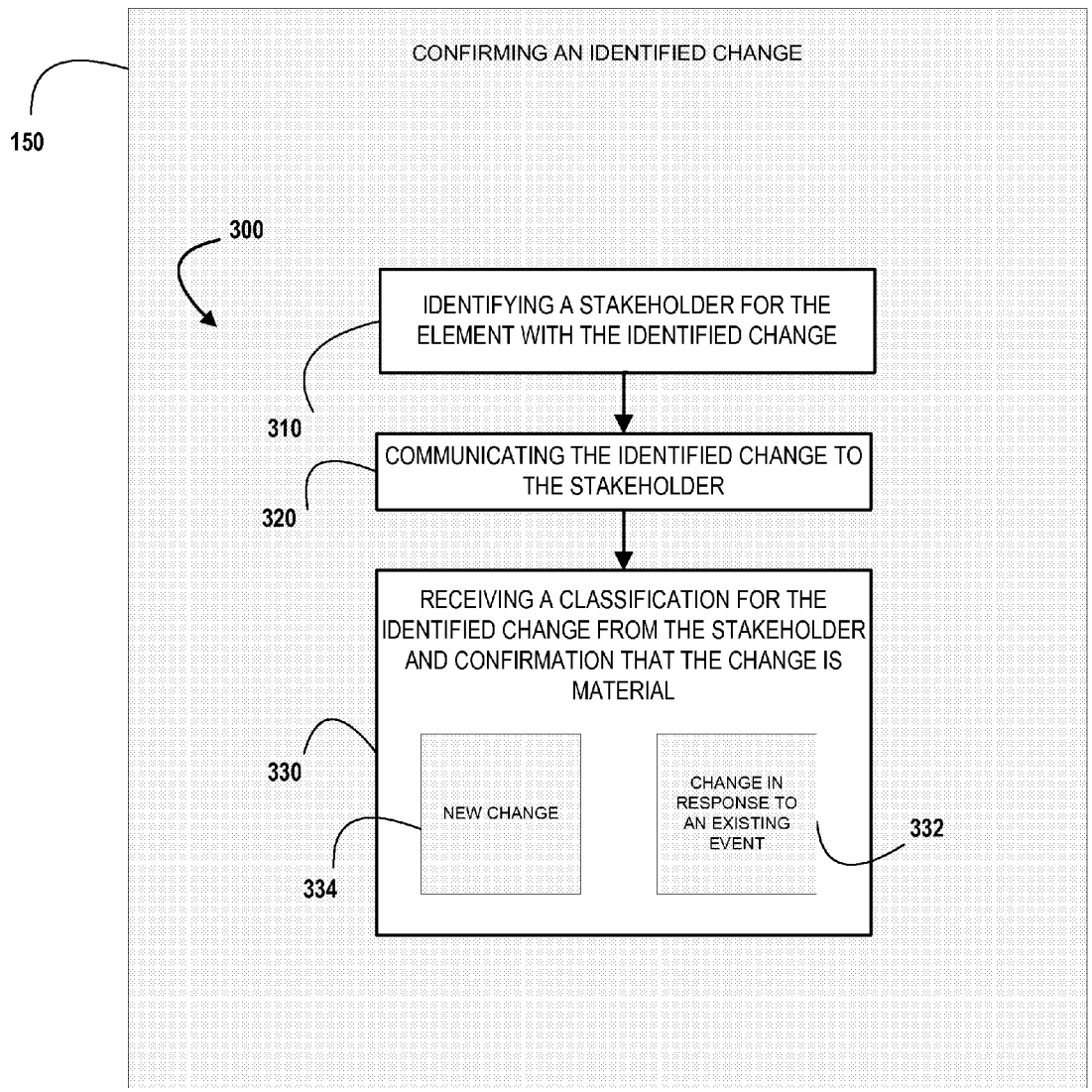

FIG. 3 is a flow diagram illustrating a process flow for confirming an identified change, in accordance with embodiments of the invention.

Figure 4:
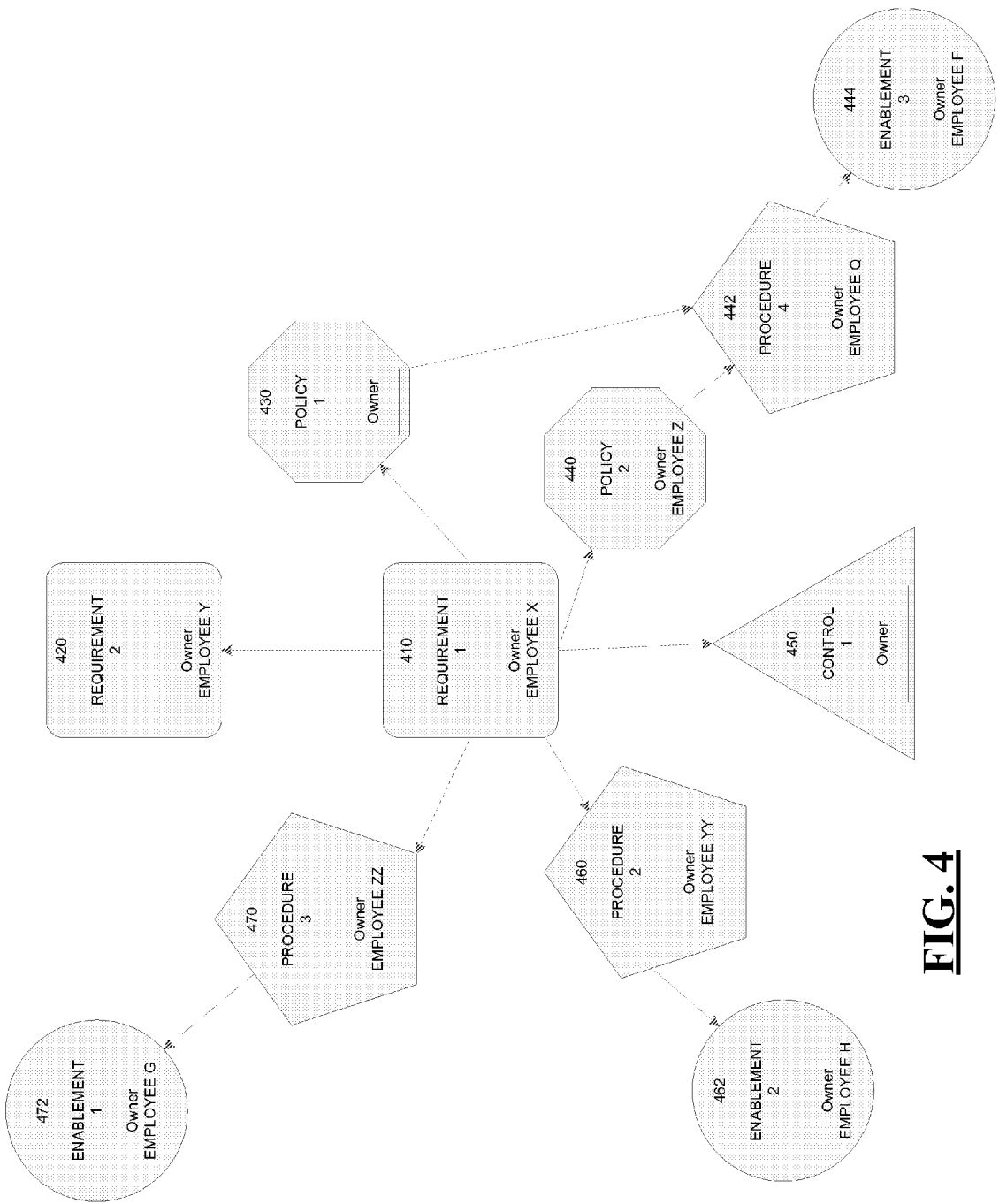

FIG. 4 is a nodal diagram illustrating the relationships between a plurality of elements, in accordance with embodiments of the invention.

Figure 5:
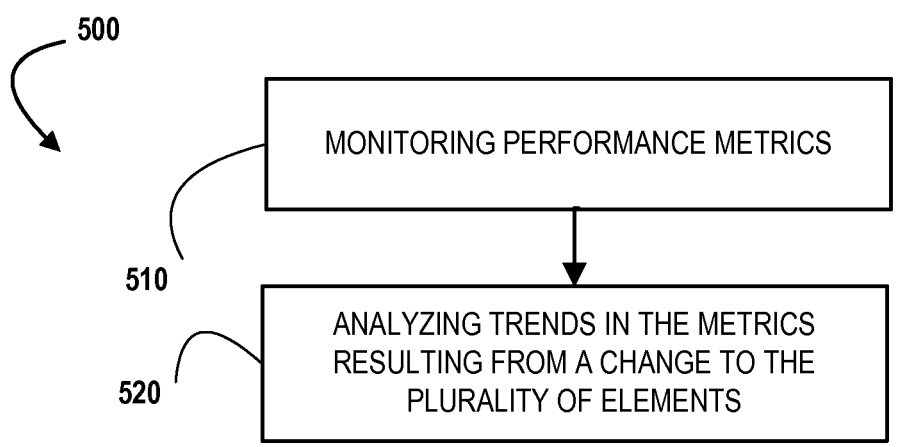

FIG. 5 is a flow diagram illustrating a process flow for a system for analyzing trends in metrics, in accordance with embodiments of the invention.

Figure 6:
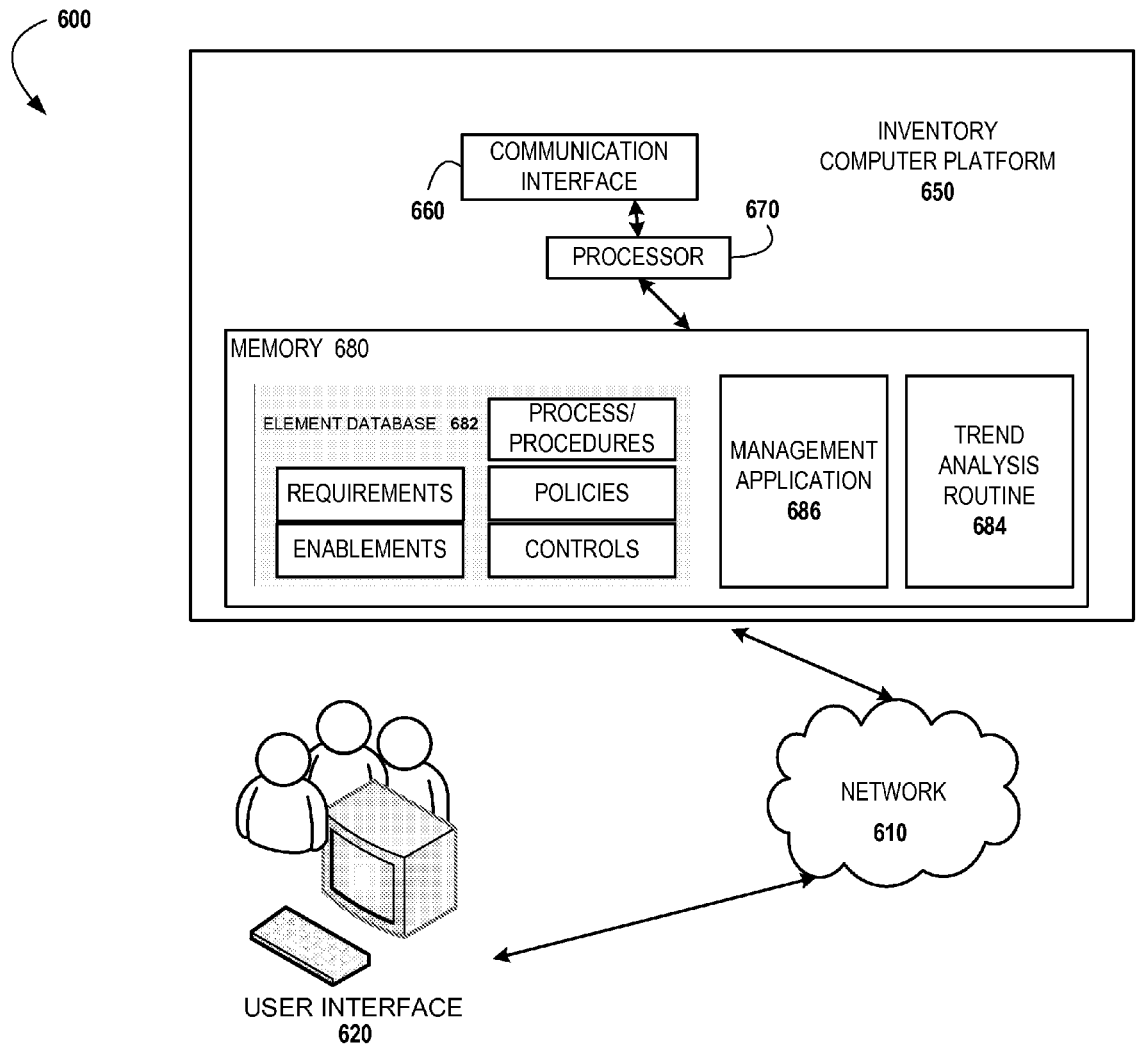

FIG. 6 is a block diagram illustrating an apparatus, in accordance with embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Although embodiments of the present invention described herein are generally described as involving an entity, it will be understood that this invention may involve one or more persons, organizations, businesses, merchants and/or other institutions, such as financial institutions, services providers etc. that implement one or more portions of one or more of the embodiments described and/or contemplated herein.

It will also be understood that "element" or "control element" as used herein, generally refers to anything that an entity is required, or elects, to follow, implement and/or adhere to in the conduct of its business or operation and includes, but is not limited to, laws, regulations, requirements, contracts, contract terms, policies, procedures, processes, enablements, training programs, supports, tools, incentives, business activities, controls and metrics. A "requirement" or "requirements" as used herein in the context of elements are the rules generated by an entity that define how the entity is going to run its business. Requirements are in turn defined or influenced by a number of sources, including, but not limited to, laws and regulations, contractual obligations, investors, obligations to investors and any limits imposed by the participation in certain government programs. A "policy" or "policies" as used herein in connection with elements refers to an entity's interpretation of its requirements. A "process", "processes", a "procedure" or "procedures" as used herein in the context of elements are the expression of the manner in which the entity will adhere to its policies. An "enablement" or "enablements" as used herein in the context of elements refers to any support provided by the entity to enable execution of the entity's policies, processes and procedures. Examples of enablements include, but are not limited to, employee training and education, tools and incentives. A "control" or "controls" as used herein in connection with elements refers to any metric that measures the performance of a process or procedure. Controls include, without limitation, any quality assurance measures that detect and prevent violations of the entity's policies or procedures or validate performance in accordance with a policy or procedure.

As an illustrative example of the foregoing taken from the potential elements that an entity, such as a financial institution might encounter, a requirement might be a state law that requires all mortgage documents to have the notarized signature of all buyers on a loan. The policy related to this requirement may be the financial institution's mortgage manual that indicates all mortgages issued by the financial institution will have a notarized signature from each buyer on the following documents and then sets out each document that must be signed and notarized by each buyer. The related procedure may specify that the financial institution's mortgage agents will all be registered notary publics and that all buyers will be required to be physically present at the closing unless the buyer makes alternative arrangements prior to closing to have the documents executed separately before a notary public. An enablement may be the employee training program the financial institution implements to train its mortgage agents in proper notarization and a control might be a program that reviews a sampling of completed mortgages to determine if the documents were in fact signed and notarized by all of the buyers.

It will also be understood that "connected", "related" or "relationship" as used herein in the context of elements and control elements refers to the interconnectedness of one or more elements so that a change to one element necessitates a change to the related element. It will be understood that there may be different degrees of relatedness between elements. As used herein, "siblings" are those elements that are directly related to a selected element, i.e. those elements that are one step removed from the selected element. "Cousins" are those elements that are directly related to a selected element or to a sibling of a selected element, i.e. those elements that are one to two steps removed from the selected element. As used herein, a "family" are those elements that are related to a selected element but are not sibling or cousins, i.e. they are three or more steps removed from the selected element. A "descendent" are those elements under a selected element and an "ancestor" are those elements over a selected element.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media Computer program code for carrying out operations of embodiments of the present invention may be written in an object oriented, scripted or unscripted programming language. However, the computer program code for carrying out operations of embodiments of the present invention may also be written in conventional procedural programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, apparatus, systems, methods and computer program products are herein disclosed for managing and tracking an inventory of controlled elements in order to map the relationships between the elements and ensure changes made to any element are correctly adopted and incorporated into all related elements. Embodiments of the present invention will increase the visibility of how elements within the entity are related and how a change to one element may affect other elements and the entity as a whole. Embodiments of the invention will also systematize the implementation of changes to related elements required by the change to any one or more elements. Inasmuch as financial institutions are subject to a large number of various and changing requirements, often times in the form of changing laws and regulations that must be implemented quickly and correctly for the financial institution to operate, specific embodiments disclosed herein relate to a financial institution managing and tracking an inventory of elements.

FIG. 1 illustrates a general process flow 100 for an apparatus or system for managing and tracking a plurality of elements in accordance with an embodiment of the present invention. As represented by block 110 a database is maintained comprising a plurality of elements. In some embodiments the elements will be stored in the database in spreadsheet formats. However, the elements may be stored in the database in any format suitable to identify the element name, the contents of the element, the element owner and a record identifier. As represented by block 120, an owner must be assigned to each element. As illustrated by block 130, the relationships between elements are identified and those elements that are related are linked. It will be understood that such links are not constant but may change over time as the relationships between elements are continually reviewed and the resulting links are updated and changed. Block 140 represents the monitoring of the elements, in some instances via a processor, to identify any changes to the elements. A change to an element may be anything from a cosmetic change such as the change to the title of a specific policy, which may not require changes to related policies, to a substantive change that will alter all of the elements' descendents. As represented by block 150, any identified change will be confirmed, and as shown in block 160, if the identified change is material, an event is created. An "event" as used herein refers to the activities that must be completed in order to incorporate the identified change. An event includes the identification of all related elements that are potentially impacted by the change and the steps that must be taken by the related elements to incorporate the change, the time for completing the change etc. In some instances, the tasks required by an event will be dictated by the terms of an applicable service level agreement. As represented by block 170, the owners of elements related to the element with the identified change are notified of the event. Changes to the plurality of elements are then monitored, as shown in block 180, to determine when all of the activities required by the event are completed. It will be understood that as each element descended from the originally identified element is also changed to incorporate the identified change, the processes identified in blocks 140-180 of identifying changes to elements, confirming changes, creating an event and notifying related owners will occur for each descendent. By monitoring all of these changes 180, the system can determine when all of the activities required by a given event have been completed. Once all activities or tasks from an event have been completed, all of the owners of elements related to the event will be requested to provide final confirmation that no further changes are required, block 190.

FIG. 2 provides a flow diagram 200 illustrating a general process flow of an apparatus or system for assigning an owner to each element 120. The process flow 200 for assigning an owner to each element may involve, but is not limited to, identifying elements without an owner, block 210 or identifying elements with an owner that is no longer suited to own the identified element, block 240. If an element is identified that does not have an owner 210, a new owner will be selected for the element 220. An element may not have an owner for a number of reasons, including without limitation, the element is new, the previous owner was terminated or has taken a leave of absence etc. Selecting a new owner for the element 220 may be performed in a number of ways, for instance, if a line of succession was previously created for the element, ownership may be automatically assigned by the system to the employee identified as a successor. Similarly, if the previous owner had authority to delegate responsibility for ownership of the element in her absence, the system or apparatus may automatically assign ownership to the identified new owner. If the new owner is not predetermined, in some embodiments, the system will send a notification to the manager of the previous owner indicating the element needs a new owner and requiring the manager to specify a new owner. Such notification may be sent electronically, via e-mail, chat, instant messaging, text etc. or similar communication channels and automatically generated by the system or sent ad-hoc by a system user. If the manager does not respond after a pre-set period of time, the system may provide notification to the next individual in the entity's management hierarchy until a new owner is specified. After a new owner is selected 220, ownership of the element is communicated to the new owner and confirmation is received from the new owner, as illustrated by block 230. Such a communication with the new owner may take the form of, but is not limited to, an e-mail, or similar electronic communication wherein the recipient is requested to confirm receipt of the e-mail by actuating a link or button in the electronic communication. In some embodiments, confirming ownership of the element involves not only acknowledging receipt of the communication 232, but also acknowledging the requirements of owning the element 234 and/or confirming the requirements will be followed 236. In some embodiments, the new owner will not have the option to not acknowledge receipt of the communication 232 or not acknowledge and confirm the requirements of ownership 234, 236 (that is to reject the ownership) and failure to take these steps will merely result in additional communications being sent to the new owner until acknowledgement and confirmation is received. Certain embodiments of the invention will require the confirmation from the owner to be received within a specified time period (e.g. five business days, twenty-four hours etc.) Failure to confirm ownership of the element in the specified time period may result in additional communications to the new owner or communications to the new owner's manager etc.

Still referring to FIG. 2, in some instances, the process flow 200 of assigning an owner to each element may involve identifying elements with an owner that is no longer suited to own the identified element, represented as block 240. An owner may no longer be suited to own an element for a number of reasons, for instance, the element may be associated with a specific group or division within the entity and the existing owner has been transferred to a new position outside of that group or division. Moreover, the element owner may have failed to comply with the requirements of ownership of the specific element and needs to be replaced. Determining whether an existing owner needs to be replaced may be done manually, such as if a manager indicates that the existing owner needs to be replaced, or the system may automatically identify that the owner is not suited to own the element, e.g. the owner's job title, identification number or other indicator suggests the owner is in a different business unit from the element she owns. If an element is identified as having an owner that is no longer suited to own the element 240 a new owner will be selected for the element, as illustrated by 250. This selection may occur in the same manner as discussed in connection with block 220 for the selection of a new owner for an element without an owner. Once a new owner is selected 250, ownership of the element is communicated to the new owner and the new owner must confirm the new ownership of the element, shown at block 230. In some embodiments, the new owner will be required to acknowledge receipt of the communication regarding ownership 232, acknowledge the requirements of ownership 234, and/or confirm the requirements will be followed 236. As with the other communications discussed herein, the communication may be completed through any means sufficient to convey the necessary information, but in some instances will be completed through electronic communications, such as e-mail. In some embodiments of the present invention, the selection of a new owner, either because an element has no owner or has an owner that is no longer suited to own the element, will function as a change to an element that will be monitored and processed in accordance with the process flow 100.

Referring now to FIG. 3, wherein a general process flow 300 for an apparatus for confirming an identified change 150 is illustrated. The potential range of changes to any given element is significant and every change may not need to be communicated to the owners of elements related to the changed element. For instance, if a house cleaning amendment is passed by a state legislature to correct a few minor errors in a law that informs a requirement, this change may be reflected in a change to the corresponding element in the database. However, it may not be necessary for such a change to be communicated to the owners of all related elements. Moreover, inasmuch as each change to related elements in response to an initial change will also be identified by the system as a change to an element, in certain embodiments any given change will need to be classified so that the system does not end up in an endless loop but progresses to a point where all of the tasks in an event are completed. As represented by block 310, in some instance confirming an identified change will involve identifying a stakeholder for the element with the identified change. A stakeholder is an individual or group of individuals within the business hierarchy that is assigned to coordinate changes to a particular element type. For instance, a compliance officer within an entity may be identified as the stakeholder for all requirements. The director of human resources may be identified as the stakeholder for all procedures and a customer service manager may be the stakeholder for controls. As illustrated by block 320, the identified change will be communicated to the identified stakeholder and as shown in block 330 the stakeholder will classify the identified change and confirm that the change is material and requires action by related element owners or does not require any further action. In some embodiments, the stakeholder will classify the identified change as either being a new change or as a change in response to an existing event. This classification allows the system to accurately monitor element changes to determine when an all tasks associated with an event have been completed.

As a non-limiting example of the foregoing, say a business has a policy that indicates that female employees that have been with the business for one year will be permitted one month of paid leave upon the birth or adoption of a child. The business' procedures governing how to request time off and provide notice to supervisors would be identified as a procedure related to the maternity leave policy. A training program that instructs supervisors on the business' leave policies will also be identified as being related to the maternity policy but the training program covering proper accounting procedures would not be identified as being related to the maternity policy. If the business elects to change its maternity leave policy to allow paid time offer for male employees upon the birth or adoption of a child, the maternity leave element within the database would be modified to reflect the new paternity leave policy. The stakeholder for policies in this business may be the human resources manager. Accordingly, the change to the maternity leave policy will be communicated to the human resources manager and he or she will classify the change as a new change and indicate that the change is material. In response, an event will be created. This event may include an indication that the procedures related to requesting time off must be updated to cover the scenario where a male employee intends to take paternity leave and the supervisor training program will need to be changed to reflect the business' new position regarding paternity leave. The event will be communicated to the individuals that own the related elements (e.g. a department manager, head of personnel, the director of employee training etc.). When the procedure for requesting time off is changed to include the possibility of a male employee taking paternity leave, the corresponding element in the database will be changed. The stakeholder for procedures will be notified of the change and classify the change as a change in response to an existing event. A similar process will occur for the change to the training element. If however, the change to the training element is related to another enablement or a control that is not a descendent of the maternity policy, this change may give rise to a new event requiring the descendents of the training policy to implement new changes. Say for example, an instructor who had been associated with a training policy for IT training has now been appointed to instruct supervisors on the new paternity policy. The IT training element is not related to the maternity policy but must now change in response to a change to its sibling element. Once all of the activities identified in the event have been performed, the owner of the policy, the owner of the procedure and the owner of the enablement will all be required to provide final confirmation that no further changes are required.

FIG. 4 provides a demonstrative nodal diagram illustrating the relationships between a plurality of elements, in accordance with embodiments of the invention. In some embodiments of the present invention the apparatus or system will include the functionality to generate a similar nodal diagram or map to illustrate the relationships and links between the plurality of elements in the database. In some such embodiments, the nodal diagram will be presented on a display and can be printed, saved or otherwise stored in an electronic format enabling the nodal diagram to be electronically communicated. Some embodiments will include the functionality to generate the textual equivalent of FIG. 4. wherein the relationships and links between various elements are described in a narrative format. FIG. 4. illustrates a simplified form of a nodal diagram of a plurality of elements wherein all of the elements are related to a single centralized element, in this instance Requirement 1 410. It will be understood that in use, a relationship map, similar to FIG. 4, may be more complex, illustrating a web of related elements with no central element from which all other elements depend. FIG. 4 includes, Requirement 1 410, Requirement 2 420, Policy 1 430, Policy 2 440, Procedure 4 442, Enablement 3 444, Control 1 450, Procedure 2 460, Enablement 2 462, Procedure 3 470 and Enablement 3 472. An owner is identified for each of the elements (e.g. Employee X, Employee Y etc.) with the exception of Policy 1 430 and Control 1 450. All of the elements in FIG. 4. are related to Requirement 1 410, that is a change to Requirement 1 410 will necessitate a change in all of the other elements. Accordingly, as illustrated by the process flow 100 of FIG. 1, the elements have been identified as being related and the related elements were linked 130. This linking is illustrated in FIG. 4 by the directional arrows extending between the elements. Requirement 2 420, Policy 1 430, Policy 2 440, Control 1 450, Procedure 2 460 and Procedure 3 470 are all siblings of Requirement 1 410 because they are one step removed. The elements one further step removed, i.e. Procedure 4 442, Enablement 2 462 and Enablement 1 472 are cousins of Requirement 1 410 and Enablement 3 444 is in Requirement 1's 410 family, because it is three steps removed from Requirement 1 410. Each element included in FIG. 4, with the exception of Requirement 1 410, is a descendent of Requirement 1 410. Similarly, any element that precedes another element moving towards Requirement 1 410 is an ancestor of the elements that follow the element. As shown in FIG. 4, Procedure 4 442 and Enablement 3 444, are descendents of Policy 1 430, as well as Policy 2 440. Accordingly, any change to Policy 1 430 may necessitate a change to Procedure 4 442 and Enablement 3 444 but should not require a change to Policy 2 440.

Referring now to FIGS. 1-4 to illustrate an example of the process flow 100, 200 and 300 with reference to the elements in FIG. 4. Each of the numbered elements 410-470 are elements that are maintained in a database 110. Each element is assigned an owner. As illustrated in FIG. 4. Policy 1 430 and Control 1 450 do not currently have an owner. The system will identify these elements consistent with the process flow 200, block 210 of FIG. 2. A new owner will be selected for each element 220 and ownership of the element will communicated to the respective owners and confirmation of said ownership will be received 230. The system will then monitor the elements to identify changes to an element. Say for example Procedure 3 470 is changed, the change is identified 140 and confirmed to be a new material change 150. An event will be created 160 and Employee G, the owner of Enablement 1 472 will be notified of the event 170. Employee G will take all necessary actions to complete the required tasks identified in the event and Enablement 1 472 will be changed. When Enablement 1 472 is changed, the change is identified 140 and according to the process flow 300 of FIG. 3, the stakeholder assigned to enablements will be identified 310 and will receive a communication regarding the change 320. Inasmuch as this is a change in response to an existing event 332 the stakeholder will classify it as such and confirm that it is material 330. The system, which is monitoring the plurality of elements to determine when all of the activities required by the event are completed 180, will note that the change to Enablement 1 472 is the last activity required by the event and a request will be sent to Employee G to confirm that no further changes are required 190.

To illustrate the same, consider if Policy 2 440 was a financial institution's policy that states that all lending decisions must be promptly communicated to the borrower and Procedure 4 442 dictates that a bank employee in attempting to communicate the lending decision to a borrower in compliance with Policy 2 440 is to call the borrower's home phone twice in a twenty-four hour period, an alternate phone twice in the following twenty-four hour period and if the borrower cannot be reached through those calls to thereafter wait for the borrower to initiate contact with the financial institution. If Policy 2 440 is changed to specify that all lending decisions must be communicated to the borrower within thirty-six hours, given the relationship between Policy 2 440 and Procedure 4 442, Procedure 4 442 must be changed to comply with the revised Policy 2 440. An event would be created as described in connection with process flows 100-300 and Employee Q and Employee F would be notified of the event and would be required to perform the tasks set forth in the event. In response to the change to Policy 2 440 and the resulting event, Procedure 4 442 may be amended to specify that the two calls to the borrower's house are to be made in a twelve hour time period followed by two calls to the alternate number in the following twelve hour time period. This change to Procedure 4 442 would be identified and confirmed consistent with process flows 100 and 300 and Employee F would be notified of the change to Procedure 4 442. If the change to Procedure 4 442 requires additional changes to Enablement 3 444 not required by the change to Policy 2 440 a separate event may be created to which Employee F must adhere. The required changes will then be incorporated into Enablement 3 444 and the system will determine that all activities required by the outstanding events have been completed and request final confirmation from Employee Q and Employee F that no further changes are required.

As a further illustration, consider these same examples wherein Policy 2 440 and Procedure 4 442 have the meanings ascribed above, and consider further that Policy 1 430 is a financial institution policy requiring that all customers designate a home phone number that will be the primary point of contact for all calls originating from the financial institution. If Policy 1 430 is subsequently changed so that all customers are permitted to designate a home phone number, cell phone number or work number as their primary point of contact for all calls originating from the financial institution, this may affect the related Procedure 4 442 inasmuch as Procedure 4 may need to be amended to specify that the first two calls are to be made to the primary phone number (whether or not it is a home phone number). Accordingly, a change to Policy 1 430 will give rise to an event and the notice, monitoring and change procedures of process flow 100.

Referring now to FIG. 5, wherein a process flow 500 for a system or apparatus for analyzing trends in metrics consistent with an embodiment of the present invention is provided. As represented by block 510, the system monitors controls, i.e. the entity's performance metrics. Such metrics may include measurement of how well the entity is adhering to is stated policies and procedures. For instance, in a sales business, if a policy requires that all sales be verified and approved by a manager before a commission is earned, a control might be conducting a review of past sales to determine what percentage of the time the sales were verified and approved before a commission was earned. A bank procedure may require a specific number range to be entered into a form on a document, i.e. a number between two hundred and eight hundred, if the number is outside of the range an error occurs in the program. A control may be a measurement of the number of times an error message was generated related to this data entry point. As represented by block 520, trends in the metrics resulting from a change to the plurality of elements are analyzed, in some instances, via a processor. Analyzing the trends in the metrics resulting from changes to elements can provide information regarding how well a change is performing and provide information regarding the effect changes to various elements have on the entity's operation. For instance, if a control goes down (e.g. measuring customer satisfaction in the form of survey results) beginning June 1 and a new associate training program was introduced on May 31, 2011, it may indicate that the new training program is ineffective and needs to be changed further. Analyzing trends in metrics may also provide information regarding when the majority of changes occur within the entity. For instance, if an analysis of metric trends indicates that an entity's changes consistently occur at the end of the first quarter in each fiscal year, it may indicate that a new elective change that is likely to have a broad ranging impact should not be introduced until later in the year. Such information may also indicate that the entity should change its staffing levels at different points in the year to accommodate the work created by implementing a large number of changes. Analyzing metrics trends may also have a predictive effect allowing an entity to project the potential effect an element change will have on related controls. If, for instance, it appears from the analysis of the controls that historically when a policy relating to employee sick leave is changed the controls relating to employee productivity dip for a period of time but return to, or exceed, previous levels within two months. This information may allow the entity to absorb its loss of production due to a future change to its sick leave policy. In some embodiments (not shown), the performance metrics and or trends in the metrics may be presented to a user in a visual format on a user interface, such as a display or computer monitor.

It will be understood that the method for managing and tracking an inventory of elements as illustrated by the process flows 100, 200, 300 and 500 of FIGS. 1-3 and 5 and the nodal diagram of FIG. 4 can be embodied in a number of different apparatuses and systems. FIG. 6. provides a block diagram illustrating the technical components of such a system 600, in accordance with an embodiment of the present invention. As illustrated, the system 600 includes a network 610, a user interface 620 and an inventory computer platform 650.

The inventory computer platform 650 may include any computerized apparatus that can be configured to perform any one or more of the functions of the invention described herein. In accordance with some embodiments, for example, the inventory computer platform 650 may include an engine, a platform, a server, a database system, a front end system, a back end system, a personal computer system, and/or the like. In some embodiments, such as the one illustrated in FIG. 6, the inventory computer platform 650 includes a communication interface 660 a processor 670 and a memory 680. The communication interface 660 is operatively and selectively connected to the processor 670, which is operatively and selectively connected to the memory 680.

The communication interface 660, generally includes hardware, and, in some instances, software, that enables the inventory computer platform 650 to transport, send, receive, and/or otherwise communicate information to or from other communication interfaces. For example, the communication interface 660, may include a modem, server, electrical connection and/or other electronic devices that operatively connect the inventory computer platform 650 to another electronic device, such as the user interface 620.

The processor 670 generally includes circuitry or executable code for implementing the audio, visual, and/or logic functions of the inventory computer platform 650. For example, the processor may include a digital signal processor device, a microprocessor device, and various analog-to-digital converters, digital-to-analog converters, and other support devices. Control and signal processing functions of the system in which the processor resides may be allocated between these devices according to their respective capabilities. The processor 670 may also include functionality to operate one or more software programs based at least partially on computer-executable program code portions thereof, which may be stored, for example, in a memory device, such as the memory 680 of the inventory computer platform 650.

The memory 680, may include any computer-readable medium. For example, memory may include volatile memory, such as volatile random access memory (RAM) having a cache area for the temporary storage of data. Memory 680 may also include non-volatile memory, which may be embedded and/or may be removable. The non-volatile memory may additionally or alternatively include an EEPROM, flash memory, and/or the like. The memory 680 may store any one or more pieces of information and data used by the inventory computer platform 650 to implement the functions of the inventory computer platform 650. The memory 680 may also store software programs, applications or other computer-executable program code, such as a management application 686 and trend analysis routine 684.

It will be understood that the inventory computer platform 650 can be configured to implement one or more portions of the process flows described and/or contemplated herein. For example, as illustrated in FIG. 6, a plurality of elements, including requirements, enablements, policies, controls and processes/procedures may be maintained in an element database 682 and stored in the memory 680. A management application 686 may also be stored in the memory 680 and executable by the processor 670 and configured to monitor the plurality of elements to identify changes to the elements. The management application 686, or a separate application, may also be configured to operatively connect with the communication interface 660 to notify the owners of related elements of the creation of an event or to receive inputs from a user through the user interface 620 to identify a new owner for an element. A trend analysis routine 684 may also be stored in the memory 680, executable by the processor 670 and configured to monitor performance metrics, analyze trends in the metrics resulting from a change to one or more of the elements and display the performance metrics and trends on the user interface 620.

As shown in FIG. 6, the system 600 may also include a user interface 620. In some embodiments, the user interface 620 includes one or more user output devices, such as a display and/or speaker, for presenting information to a user. In some embodiments, the user interface 620 includes one or more user input devices, such as one or more buttons, keys, dials, levers, directional pads, joysticks, accelerometers, controllers, microphones, touch pads, touch screens, haptic interfaces, microphones, scanners, motion detectors, cameras, and/or the like for receiving information from a user.

As shown in FIG. 6, the inventory computer platform 650 and the user interface 620 are each operatively and selectively connected to the network 610, which may include one or more separate networks. In addition, the network 610, may include a local area network (LAN), a wide area network (WAN), and/or a global area network (GAN), such as the Internet. It will also be understood that the network 610 may be secure and/or unsecure and may also include wireless and/or wireline technology.

It will be understood that the inventory computer platform 650 in performing one or more portions of the process flows described and/or contemplated herein will operatively connect to the network 610 through the communication interface 660 to communicate or receive data. For instance, in communicating ownership of an element to its new owner and receiving confirmation from the new owner (as illustrated in FIG. 2, block 230), the inventory computer platform 650 may access the user interface 620 over the network 610 to electronically send a communication to the new owner 230, receive acknowledgment of the requirements of ownership from the new owner 234 and confirmation that the requirements will be followed 236. Similarly, in communicating an identified change to a stakeholder and receiving a classification for the identified change form the stakeholder (as illustrated in FIG. 3, blocks 320 and 330), the inventory computer platform 650 may access the user interface 620 by using the communication interface 660 to operatively connect to the network 610. It will be understood that although FIG. 6. only includes an illustration of a single user interface, embodiments of the invention may involve a number of user interfaces, e.g. a user interface for each element owner, stakeholder etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for managing and tracking an inventory of elements, the method comprising:
   maintaining a database comprising a plurality of elements;
   assigning an owner to each element, wherein an owner is an individual primarily responsible for the implementation of an element;
   identifying relationships between elements, wherein a change in a first element causes a change in implementation of a second element;
   monitoring, via a computing device processor, the plurality of elements to identify a change to the first element;
   creating an event when the change is material, the event comprising at least one activity that must be completed to incorporate the change for the second element;
   notifying the owners of the second element of the event;
   monitoring, via the computing device processor, changes to the plurality of elements to determine when all of the activities required by the event are completed;
   requesting a final confirmation from all of the owners of elements related to the element with the change, once all activities in the event have been completed, that no further changes are required;
   wherein assigning an owner to each element comprises:
   identifying an element in need of a new owner;
   selecting a new owner for the element, wherein select the new owner for the element comprises:
   sending a notification to a manager of the previous owner requiring the manager to specify the new owner;
   determining if the manager responds to the notification within a preset period of time; and
   sending a notification to a higher level manager in a management hierarchy when the manager does not respond to the notification within the preset period of time; and
   communicating ownership of the element to the new owner wherein the new owner must confirm ownership of the element.

2. The method of claim 1 wherein the plurality of elements include one or more of the following: laws, regulations, requirements, contracts, contract terms, policies, procedures, processes, enablements, training programs, supports, tools, incentives, business activities, controls and metrics.

3. The method of claim 1, wherein the element is in need of the new owner because of a characteristic of the element, the characteristic being selected from the group consisting of:
   the element does not have a current owner, and
   the current owner is not suited to own the element.

4. The method of claim 1 further comprising:
   confirming an identified change by identifying a stakeholder for the element with the identified change, wherein a stakeholder is an individual or group of individuals that is responsible for coordinating changes to a particular element type;
communicating the identified change to the stakeholder;
receiving a classification for the identified change from the stakeholder; and
confirming that the identified change is material.

5. The method of claim 4 wherein the classification for the identified change comprises one of the following: a new change or a change in response to an existing event.

6. The method of claim 1 further comprising monitoring performance metrics and analyzing trends in the metrics resulting from a change to one or more of the plurality of elements.

7. The method of claim 1 further comprising presenting, via a display, a visual representation of the relationships between elements.

8. An apparatus, comprising:
a memory, wherein a database comprising a plurality of elements is stored;
a processor operatively connected with the memory, wherein the processor is configured to:
maintain a database comprising a plurality of elements;
assign an owner to each element, wherein an owner is an individual primarily responsible for the implementation of an element;
identify relationships between elements, wherein a change in a first element causes a change in implementation of a second element;
monitor the plurality of elements to identify a change to the first element;
create an event when the change is material, the event comprising at least one activity that must be completed to incorporate the change for the second element;
notify the owners of the second element of the event;
monitor changes to the plurality of elements to determine when all of the activities required by the event are completed;
request a final confirmation from all of the owners of elements related to the element with the change, once all activities in the event have been completed, that no further changes are required;
wherein assigning an owner to each element comprises:
identifying an element in need of a new owner;
selecting a new owner for the element, wherein select the new owner for the element comprises:
sending a notification to a manager of the previous owner requiring the manager to specify the new owner;
determining if the manager responds to the notification within a preset period of time; and
sending a notification to a higher level manager in a management hierarchy when the manager does not respond to the notification within the preset period of time; and
communicate ownership of the element to the new owner wherein the new owner must confirm ownership of the element.

9. The apparatus of claim 8, wherein the plurality of elements include one or more of the following: laws, regulations, requirements, contracts, contract terms, policies, procedures, processes, enablements, training programs, supports, tools, incentives, business activities, controls and metrics.

10. The apparatus of claim 8, wherein the element is in need of the new owner because of a characteristic of the element, the characteristic being selected from the group consisting of:
the element does not have a current owner, and
the current owner is not suited to own the element.

11. The apparatus of claim 8, wherein the processor is further configured to confirm an identified change by
identifying a stakeholder for the element with the identified change, wherein a stakeholder is an individual or group of individuals that is responsible for coordinating changes to a particular element type;
communicating the identified change to the stakeholder;
receiving a classification for the identified change from the stakeholder; and
confirming that the identified change is material.

12. The apparatus of claim 11, wherein the classification for the identified change comprises one of the following: a new change or a change in response to an existing event.

13. The apparatus of claim 8, wherein the processor is further configured to:
monitor performance metrics; and
analyze trends in metrics resulting from a change to one or more of the plurality of elements.

14. The apparatus of claim 8, further comprising a display and wherein the processor is configured to present on the display a visual representation of the relationships between elements.

15. A computer program product comprising a non-transitory computer-readable medium having computer-executable code stored thereon, the computer-executable code comprising:
a code portion configured to receive inputs from a user to create and maintain a database comprising a plurality of elements;
a code portion configured to receive a list of owners for each element, wherein an owner is an individual primarily responsible for the implementation of an element;
a code portion configured to identify relationships between elements wherein a change to a first element causes a change in implementation of a second element;
a code portion configured to monitor the plurality of elements to identify a change to the first element;
a code portion configured to create an event when the change is material, the event comprising at least one activity that must be completed to incorporate the change for the second element;
a code portion configured to communicate the creation of an event to the owners of the second element of the event;
a code portion configured to monitor changes to the plurality of elements to determine when all of the activities required by the event are completed; and
a code portion configured to request a final confirmation from all of the owners of elements related to the element with the change, once all activities in the event have been completed, that no further changes are required;
wherein assigning an owner to each element comprises:
identifying an element in need of a new owner;
selecting a new owner for the element, wherein select the new owner for the element comprises:
sending a notification to a manager of the previous owner requiring the manager
to specify the new owner;
determining if the manager responds to the notification within a preset period of time; and
sending a notification to a higher level manager in a management hierarchy when the manager does not respond to the notification within the preset period of time; and
a code portion configured to request a final confirmation from all of the owners of elements related to the element with the change, once all activities in the event have been completed, that no further changes are required.

16. The computer program product of claim 15 wherein the plurality of elements include one or more of the following: laws, regulations, requirements, contracts, contract terms, policies, procedures, processes, enablements, training programs, supports, tools, incentives, business activities, controls and metrics.

17. The computer program product of claim 15, wherein the element is in need of the new owner because of a characteristic of the element, the characteristic being selected from the group consisting of:
- the element does not have a current owner, and
- the current owner is not suited to own the element.

18. The computer program product of claim 15, wherein the computer-executable code further comprises a code portion configured to:
- identify a stakeholder for the element with an identified change, wherein a stakeholder is an individual or group of individuals that is responsible for coordinating changes to a particular element type;
- communicate the identified change to the stakeholder;
- receive a classification for the identified change from the stakeholder; and
- confirm that the identified change is material.

19. The computer program product of claim 18, wherein the classification for the identified change comprises one of the following: a new change or a change in response to an existing event.

20. The computer program product of claim 15 further comprising:
- a code portion configured to monitor performance metrics;
- a code portion configured to analyze trends in the metrics resulting from a change to one or more of the plurality of elements; and
- a code portion configured to display the performance metrics on a display.

21. The computer program product of claim 15 further comprising a code portion configured to display a visual representation of the relationships between elements.

* * * * *